May 12, 1942.    A. E. GILBERT    2,282,470
NONSKID ATTACHMENT FOR VEHICLE WHEELS
Filed Sept. 19, 1941    2 Sheets-Sheet 1

INVENTOR
ARCHIE E. GILBERT
BY
Wheeler, Wheeler & Wheeler
ATTORNEYS.

May 12, 1942.        A. E. GILBERT        2,282,470
NONSKID ATTACHMENT FOR VEHICLE WHEELS
Filed Sept. 19, 1941        2 Sheets-Sheet 2
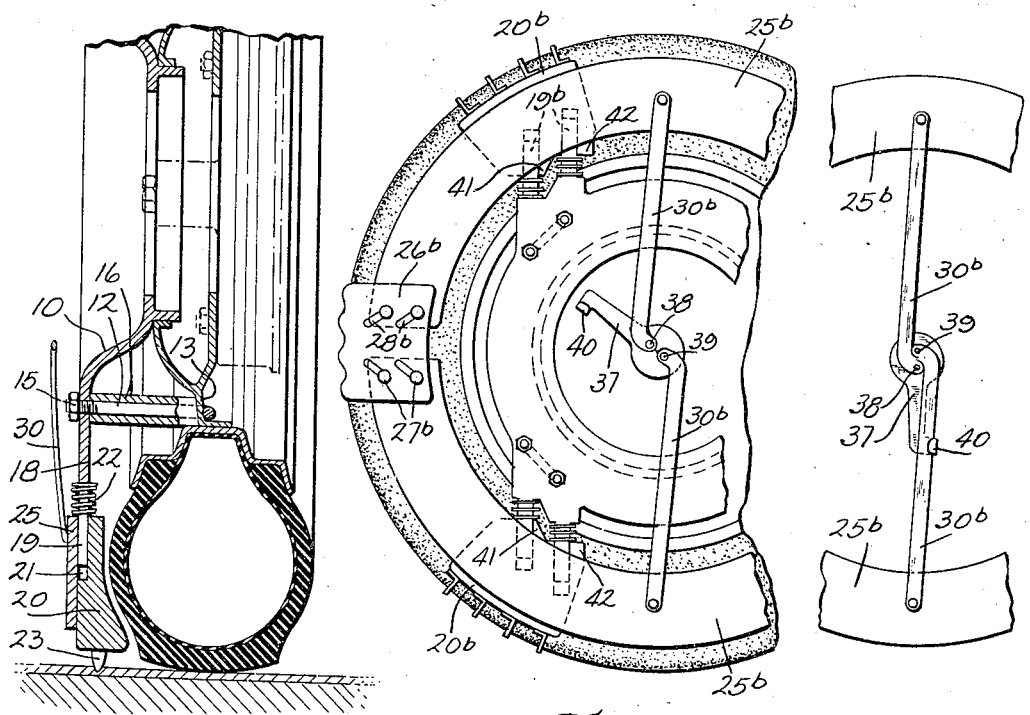
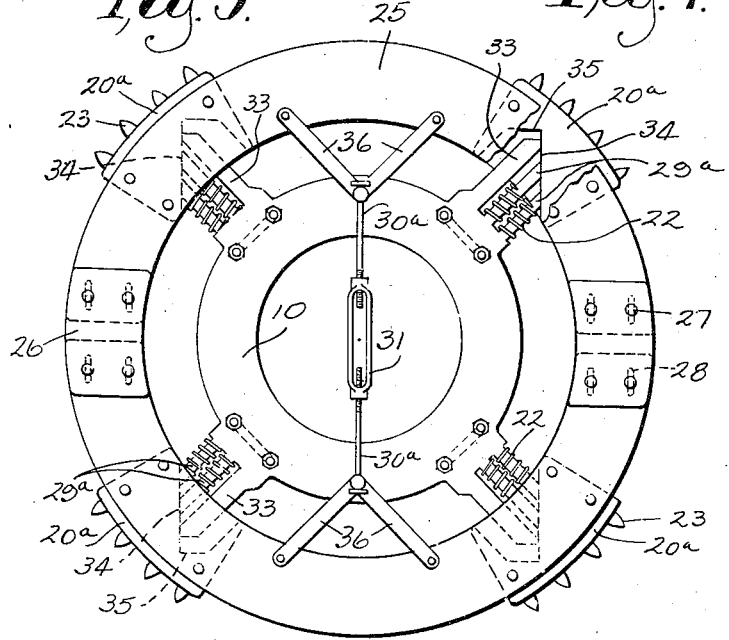
INVENTOR
ARCHIE E. GILBERT
BY
Wheeler, Wheeler & Wheeler
ATTORNEYS.

Patented May 12, 1942

2,282,470

UNITED STATES PATENT OFFICE 2,282,470

NONSKID ATTACHMENT FOR VEHICLE WHEELS

Archie E. Gilbert, Madison, Wis.

Application September 19, 1941, Serial No. 411,444

14 Claims. (Cl. 301—40)

My invention relates to improvements in nonskid attachments for vehicle wheels, this application being a continuation in part of my former application, Serial No. 324,995, filed March 20, 1940.

The object of my invention is to provide an improved substitute for the anti-skid chains commonly wound about the wheel rims and tires of motor driven vehicles when roads are slippery.

More specifically, my objects are to provide a vehicle wheel and tire casing with sets of retractible spurs located on the outer side of the wheel; to provide convenient means for retracting or projecting the spurs, whereby they may be left on the wheel when not needed; to provide means for holding the adjustable parts rigidly in retracted position to avoid vibration with consequent rattling; to provide a resilient mounting for the spurs, whereby the wheel will not be materially lifted by the set of spurs in contact with the surfaces of the roadway; and to provide arcuate mountings for the spurs which are normally separated from each other sufficiently to allow of spur projection and retraction.

Figure 1:
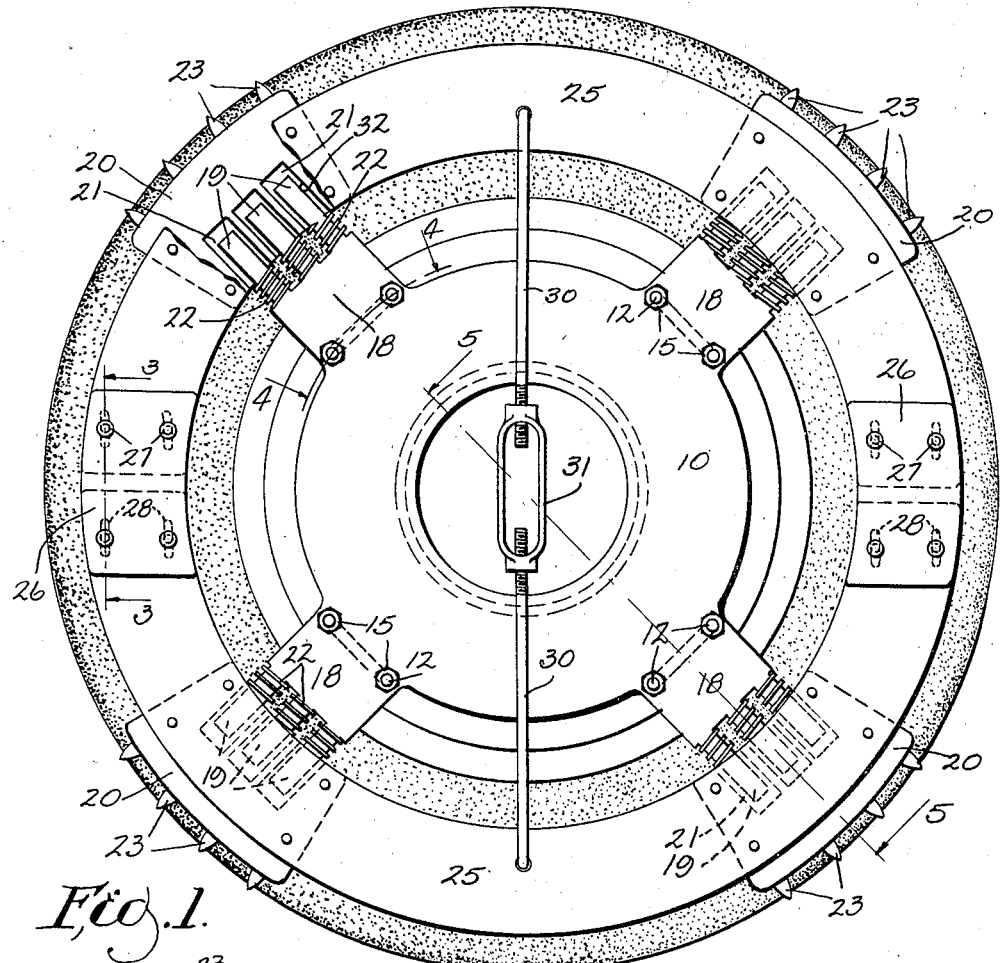
Figure 1 is a side elevation of a motor vehicle wheel to which my invention has been applied, the road gripping spurs being shown in an intermediate position.
Figure 2:
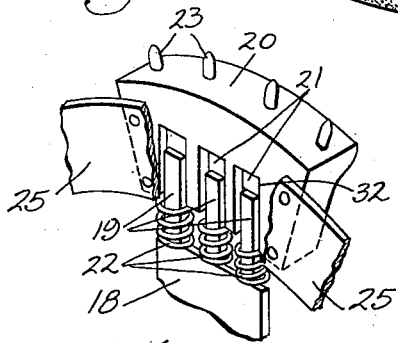
Figure 2 is a perspective view of a cast metal block provided with four of the ground gripping spurs.
Figures 3, 4:
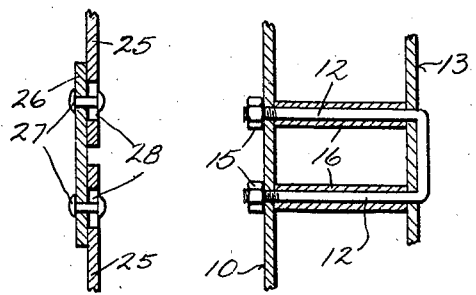

Figures 3 and 4 are detail sectional views, drawn respectively to lines 3—3 and 4—4 of Figure 1.

Figure 5 is a fragmentary sectional view, drawn to line 5—5 of Figure 1.

Figure 6 is a view similar to Figure 1, showing a modification.

Figure 7 is a fragmentary side elevation, showing a further modification.

Figure 8 is a detail view of the toggle linkage of Figure 7 in locked position.

Like parts are identified by the same reference characters throughout the several views.

Fundamentally the problem is to provide a vehicle wheel with an auxiliary set of ground grippers which may be attached to the wheel at the beginning of the winter season and which may be normally carried by the wheel without rattling and without putting the wheel out of balance, the wheel being allowed to function normally except at times when the tread surface of the tire fails to provide sufficient traction or to hold the wheel against lateral skidding tendencies. At such times the ground grippers may be immediately projected beyond the tread surface of the tire and as quickly retracted when not needed. With my improvements these adjustments may be made handily, quickly, and with good job results as to uniformity, minimum interference with balance in either position, and minimum addition to the power required to drive the vehicle when the ground grippers are in operation. In my improved structure all of the ground grippers on a single wheel may be brought into action simultaneously by a single adjustment which can be manually made without the aid of tools.

A mounting ring 10 is adapted to be secured to the side of a vehicle wheel in any suitable manner, preferably near the rim of the wheel. In Figures 1, 4 and 5, I have illustrated a form of connection comprising staple-shaped bolts having parallel arms 12 extending through the web 13 of a spokeless wheel and through the ring 10, to which these arms are clamped by nuts 15. Spacing sleeves 16 are interposed between the web 13 and the ring 10. However, any other suitable means may be employed for securing the ring 10 to the vehicle wheel.

The ring 10 has radial projections 18 provided with extensions in the form of parallel fingers 19 adapted to serve as guiding and supporting fingers for spur carrying blocks 20 provided with road gripping devices, such, for example, as the spurs 23. The blocks 20 are provided with radially extending recesses 21 which loosely receive the fingers 19, and compression springs 22, each coiled about one of the arms 21, urge the blocks 20 outwardly.

The blocks 20 are connected with each other in sets by arcuate positioning plates 25. These plates close the otherwise open sides of the recesses 21 when the parts are assembled. The plates 25 have loose end to end connection with each other, preferably by means of coupling plates 26 and bolts or rivets 27. Either the positioning plates 25 or the coupling plates 26 are longitudinally slotted to receive the bolts 27, whereby the plates 25 and 26 form an expansible and contractible ring which may control the projection and retraction of the ground gripping spurs.

In the construction illustrated, the plates 25 are nearly semi-circular in form, and each of them connects a pair of spur carrying blocks 20. In Figure 1 the central portions of the two plates 25 are shown connected with each other by link rod sections 30, and a turnbuckle 31, rotation of which in one direction will allow the holding plates 25 to be separated by the springs 22 to any extent permitted by the slots 28, thereby moving the spurs 23 outwardly into ground gripping position. Rotation of the turnbuckle in the opposite direction will, of course, retract the plates, with their blocks 20 and spurs 23, to an inactive position at the side of the vehicle wheel. Such retraction is accomplished against the tension of the springs 22.

When the spurs 23 are in ground gripping position, they are yieldingly supported by the springs 22, together with their blocks 20 and plates 25. When they are fully retracted, the blocks 20 are not only subject to spring pressure, but the side walls 32 of their recesses 21 will be in binding or wedging contact with the fingers 19 to prevent rattling vibration.

If desired, the recesses 21 may be sufficiently wide and the slots 28 of sufficient length, to allow the outer surface of the blocks 20 to project at a greater radius than the tread surface of the tire for engagement with snow or soft earth through which the spurs might slip.

The tensile strength of the links 30 must be adequate to hold the plates 25, with their blocks 20 and spurs 23, in the retracted position, but there is, of course, no tensile strain on the links when the plates and spurs are in the extended or working position. To relieve the links 30 from compression stresses they will preferably be formed of resilient material and slightly bowed, as shown in Figure 5, whereby, when any given set of spurs are subjected to the weight of the vehicle and its load, they may be pushed inwardly against the tension of the compression springs 22 and the links 30 will readily flex to allow this movement.

It is, of course, immaterial whether the spurs 23 are in the form of flukes or conical projections. The blocks 20 and projections 23 may be aptly referred to as ground grippers, and any form of ground gripper which can be socketed to receive one or more guiding projections connected with a suitable mounting, may be regarded as equivalent for the specific ground grippers illustrated in the drawings.

In Figure 6, I have illustrated a modification in which each spur carrying block 20a has a single recess, large enough to receive a plurality of fingers 29a and 33, the outer ends of which are obliquely faced to fit the oblique outer wall 34 of the recess. The finger 33 may also have a face fitting the oblique wall 35 of the recess to prevent rattling when the blocks are wholly retracted. The springs 22 are flexible like those shown in Figure 1, but the finger 33 has no spring coiled thereon. The outer end of each spring 22 spans the recess in the block and bears upon the block at the base of the recess, and also upon the inner margin of the associated positioning plate.

In Figure 6 I have also illustrated the link sections 30a as connected to the positioning plates 25 by divergent branch links 36. When the positioning plates and spur blocks are drawn inwardly by these links, the fingers 29a and 33 slide along the oblique faces or walls 34 of the recesses in the spur blocks until the fingers 33 reach the angles formed by the recess walls 34 and 35, the spurs being then wholly retracted.

In Figures 7 and 8 I have shown a modified form of controlling link, in which the link sections 30b are rectangular in cross section and connected by a toggle lever 37 pivoted to both link sections 30b at 38 and 39, respectively. To shorten the link and draw the positioning plates 25 inwardly, the toggle lever 37 will be swung about the pivot pin 38 until the pivot pin 39 has described an arcuate path carrying it slightly across the axial line of the link, whereupon the hook-shaped end 40 of the lever may be engaged with the link section across which it has just been passed.

When the lever is swung in the opposite direction it will not require to be secured, since the springs 22 will urge outwardly the plates 25 and their associated spur blocks to the extent permitted by the coupling plates 26b. With this construction, the attachment for each wheel can be instantly adjusted into and out of operative position by a single swinging movement of the lever 37, and if the linkage is not locked in the extended position no link flexion will be required when any given set of spurs is in contact with the ground.

In Figures 7 and 8 I have also illustrated a modified coupling for the ends of the positioning plates 25b. The coupling plates 26b are paired, one on each side of the associated end portions of the positioning plates 25b. The connecting bolts 27b extend through holes in the positioning plates and oblique slots 28b in the coupling plates, said slots extending from the respective end portions of the plates toward their central portions, with a pitch toward their outer margins, whereby, when the opposing ends of the positioning plates 25b are drawn apart, the coupling plates will be forced radially until their outer corrugated margins are in a position to engage the roadway and check lateral skidding movements at least twice during each revolution of the wheel. Outward movement of the coupling plates need be only sufficient to carry their outer margins slightly beyond the tread surface of the tire when the latter is under compression. In Figure 7 the ground grippers may consist of flanges instead of spurs. They are shown in ground gripping position.

The coupling plates 26 and 26b, and the connections 31 and 37 for the link sections 30, 30a and 30b, may be interchangeably used in each of the structures illustrated.

In Figure 7, the fingers 19b are parallel to the line of expanding and contracting movement of the link sections 30b, and the corresponding movements of the positioning plates 25b. The inner faces of the spur carrying blocks 20b may have portions 41 and 42 at right angles to the fingers, and arcuate outer or gripping portions in general conformity to the curvature of the corresponding portion of the tire.

I attach great importance to the fact that my improved attachment can be applied to a vehicle wheel of any ordinary construction and kept on the wheel throughout a winter season without materially affecting its balance, accurate balancing in the retracted position being possible by any ordinary means for applying balancing weights where needed.

Under ordinary circumstances, the wheels may function normally with the attachment inactive, but when needed, the ground grippers may be projected without any material loss of time, no tools being required to effect the adjustment. The attachment does not add greatly to the weight of the vehicle, the combined weight of the attachments for the four wheels being little in excess of the weight of a single spare tire.

I claim:

1. A non-skid attachment for vehicle wheels, comprising the combination of a ring-shaped mounting adapted to be attached to the outer side face of a vehicle wheel and provided with guiding projections in a plane parallel with the wheel, ground gripping members in which said projections are socketed, positioning plates, each connecting a plurality of ground gripping members, adjustable linkage connecting the positioning plates across the central portion of the space occupied by the attachment, and means for manually adjusting said linkage to hold the positioning plates and their ground gripping members either in active or inactive position.

2. A non-skid attachment as set forth in claim 1, in which the mounting is provided with springs urging the ground gripping members outwardly in a radial plane in opposition to the tension of the manually adjustable linkage.

3. A non-skid attachment for vehicle wheels, comprising the combination of a mounting provided with means for detachably connecting it with the outer face of a vehicle wheel, adjustable ground gripping members supported from the mounting in a plane common thereto, means for resiliently urging the ground gripping members outwardly in said plane toward a ground gripping position, and manually adjustable linkage for normally holding said members in inactive positions at the side of the wheel, said attachment being removable, replaceable, expansible and contractible while the wheel is resting on the ground.

4. In a non-skid attachment for vehicle wheels, the combination of a mounting attachable to the outer side face of a wheel and provided with projecting fingers, ground grippers having sockets to loosely receive said fingers, springs urging said ground grippers outwardly on the fingers, and manually adjustable cross connections between ground grippers on opposite sides of the wheel adapted to hold them in various positions of inward and outward adjustment in opposition to the pressure of the springs.

5. A non-skid attachment as set forth in claim 4, in which the cross connections are manually adjustable without the aid of tools.

6. A non-skid attachment as set forth in claim 4, in which the manually adjustable cross connections comprise link sections having turnbuckle connection with each other.

7. A non-skid attachment as set forth in claim 4, in which the manually adjustable connections comprise link sections and a toggle lever pivotally connected with each link section and adapted to be locked with the ground grippers in inactive position.

8. A non-skid attachment for vehicle wheels, comprising the combination of a mounting ring adapted to be attached to the outer side face of a vehicle wheel and provided with sets of radially projecting fingers, ground grippers having sockets, each adapted to loosely receive one set of fingers, each socket having one wall oblique to the fingers and against which the ends of the fingers may bear, said sockets being of sufficient width to allow the ground grippers to move outward and obliquely with reference to the axes of the fingers to a distance determined by the socket walls, positioning plates, each connecting a plurality of ground grippers, manually adjustable linkage connecting the intermediate portions of the positioning plates across the central portion of the space occupied by the attachment, and means for resiliently urging the positioning plates and ground grippers along the ends of the fingers and toward ground gripping position.

9. A non-skid attachment as set forth in claim 8, in which the linkage has divergent plural connections with the positioning plates.

10. A non-skid attachment as set forth in claim 8, in which the fingers of each set have binding engagement with one wall of the socket to prevent rattling.

11. A non-skid attachment for vehicle wheels, comprising the combination of a mounting provided with means for connecting it with the outer side face of a vehicle wheel between its hub and rim portions, substantially semi-circular positioning plates, concentric with the mounting, with opposing ends adjustably connected with each other in ring formation, ground grippers secured to said positioning plates, fingers projecting from the mounting and socketed in the ground grippers, springs coiled about said fingers and urging the ground grippers and positioning plates outwardly, and adjustable linkage cross-connecting the central portions of the opposing positioning plates to hold said ground grippers with their spurs either in operative or inoperative position.

12. A non-skid attachment as set forth in claim 11, in which fingers project from the mounting along lines parallel with each other.

13. In a non-skid attachment for vehicle wheels, the combination of sets of ground grippers provided with projecting spurs, arcuate positioning members connecting the ground grippers in sets, coupling members connecting the opposing ends of the positioning members in ring formation, one of each pair of coupling members being slotted and connected with the other by bolts extending through the slots, said slots being obliquely disposed, and having marginal walls adapted to urge the bolts and the coupling members outwardly when the positioning members are separated, said coupling members being thereby movable to bring their outer margins into ground gripping position.

14. In a non-skid attachment for vehicle wheels, ground grippers connected with each other in sets on opposite sides of the wheel, supports radial to the hub and loosely socketed in the ground grippers, means for resiliently urging the ground grippers outwardly, and extensible linkage connecting said sets of ground grippers across the central portion of the space they occupy to limit their outward movement to lines oblique to the supports and the side walls of their ground gripper sockets.

ARCHIE E. GILBERT.